United States Patent [19]

Toyosawa

[11] Patent Number: 4,646,280

[45] Date of Patent: Feb. 24, 1987

[54] OPTICAL DISK RECORD PLAYER WITH FAST ACCESS TIME

[75] Inventor: Masao Toyosawa, Tokyo, Japan

[73] Assignee: Sony Corporation, Tokyo, Japan

[21] Appl. No.: 702,748

[22] Filed: Feb. 19, 1985

[30] Foreign Application Priority Data

Feb. 20, 1984 [JP] Japan .................................. 59-28712

[51] Int. Cl.$^4$ ................................................ G11B 7/00
[52] U.S. Cl. ...................................... 369/50; 369/44; 358/342
[58] Field of Search ........................ 369/32, 33, 50, 53, 369/99, 43, 44; 358/342; 360/69, 73, 72.1

[56] References Cited

U.S. PATENT DOCUMENTS 4,460,988 7/1984 Gordon .................................. 369/32
4,598,394 7/1986 Nonaka .................................. 369/44

FOREIGN PATENT DOCUMENTS 53-183 1/1978 Japan .

OTHER PUBLICATIONS

Radio Shack LDOS 5.1 Operating System Manual, pp. 1–21, Copyright 1981, 1982.

Primary Examiner—Robert L. Richardson
Attorney, Agent, or Firm—Lewis H. Eslinger; Alvin Sinderbrand

[57] ABSTRACT

An optical disk record player including a disk drive motor, a pickup for retrieving information from the surface of the disk, a processing circuit for processing signals provided by the pickup, and a speed control circuit having a clock generator used for the signal processing, wherein when the program access command is entered during the playback mode at an increased or decreased disk speed that is achieved by varying the clock frequency produced by the speed control circuit, the clock frequency is temporarily changed to the normal frequency to cause the normal disk speed in which the program access mode takes place, and thereafter the clock frequency is changed back to the original frequency so that the original disk speed is restored.

11 Claims, 6 Drawing Figures

OPTICAL DISK RECORD PLAYER WITH FAST ACCESS TIME

BACKGROUND OF THE INVENTION

The present invention relates to an optical disk record player and, more particularly, to a speed control circuit used in an optical disk record player operable at a variable playback speed.

Optical disk record players in which audio information is digitized in the form of pits on the reflecting surface of a disk are generally provided with a rotational servo control system so that the disk speed relative to a pickup is constant (1.3 m/s), and optical disk record players them are further capable of increasing and decreasing the tangential disk speed so that the playback speed is made variable in a range of 2-3 percent to 20-30 percent. Such variable-speed optical record players are advantageous in that the music performance speed can be varied depending on the program, but they also have a drawback of longer access time in the variable speed playback mode, particularly when the access command for searching the beginning of a program is entered during the faster-speed mode i.e., it takes a longer time before the pickup can make a track jump from the current position to the track where the beginning of the specified program exists and the playback mode can be restored to the beginning of the program. For the system implementing a track jump, refer to U.S. patent application, Ser. No. 06/487,576 now U.S. Pat. No. 4,598,394.

The main cause of the above-mentioned longer access time is that the time constant of the optical disk tracking servo system is generally set so that the pickup is positioned in a minimal time when the disk is driven at the normal speed. On this account, the access time at either the faster-speed or slower-speed of the varied speed playback mode is from 3-4 times as long as that of the normal-speed playback mode. Moreover, if a disk has scars, data reproduced from the radio frequency (RF) signal has an increased error rate than in the case of the normal speed playback mode, resulting in a further extended access time.

SUMMARY OF THE INVENTION

In view of the foregoing circumstances, it is an object of the present invention to provide a disk speed control circuit which does not cause an extended access time in searching for a music program when the access command is entered during the access mode at a playback speed other than the normal speed.

According to one aspect of the present invention, there is provided an optical disk record player comprising a spindle motor for rotationally driving an optical disk record, a pickup for reading out information recorded on the disk, a signal processing circuit for processing signals provided by the pickup, and a speed control circuit having a clock oscillator used for the signal processing, wherein when the access signal is entered in the playback mode of an increased or decreased playback speed which is achieved by varying the clock frequency produced by the speed control circuit, the clock frequency is temporarily changed to the normal frequency to bring the spindle motor to the normal speed when the access mode is commenced, and at the end of the access mode the clock frequency is changed back to the frequency at which it was before the entry of the access signal, so that the varied speed playback mode is restored.

DESCRIPTION OF THE PREFERRED EMBODIMENT

Figure 1:
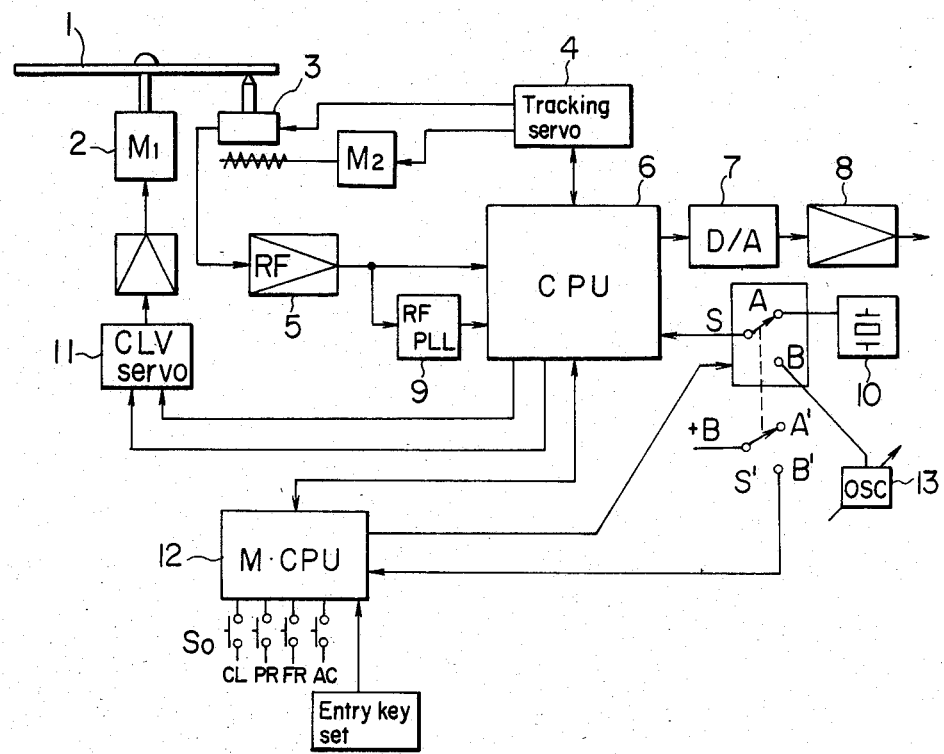
FIG. 1 is a block diagram showing in general the optical disk record player with the ability of controlling the playback speed.

The inventive disk speed control system shown in FIG. 1 includes an optical disk record 1, a spindle motor 2 and a pickup 3. The pickup 3 is operated by a motor M2 and a 2-axis mechanism that are controlled by the output of a servo control circuit 4 so that the RF signal is detected in an optimal mode through the tracking servo control or focus servo control. The detected RF signal is fed through an RF amplifier 5 to a signal processing microprocessor (CPU) 6.

The signal processing microprocessor 6 is made up of three major integrated circuits (IC). The first IC (for example, type CX-7933 manufactured by Sony Corp.) operates to detect, protect and insert the frame sync signal, demodulate the EFM signal, and separate the sub-code signals. The second IC (for example, type CX-7935 manufactured by Sony Corp.) operates to control the signal processing, and the third IC (for example, type CX-7935 manufactured by Sony Corp.) operates mainly to correct errors of CIRC.

After the error correcting operation in the signal processing microprocessor 6, data is transformed into the audio signal by being fed through a digital-to-analog (D/A) converter 7 and output amplifier 8.

An RF PLL circuit 9 is provided for detecting the RF clock signal (4.3218 MHz) in the RF signal, and it is also used to control the clock for the first IC in the microprocessor 6 and to indicate the playback speed of the optical disk 1, i.e., tangential speed, for the rotational servo control of the spindle motor 2. The RF clock signal and the master clock (8.6436 MHz) signal produced by a crystal oscillator 10 are counted down by a certain proportion and supplied to a CLV servo circuit 11, so that the spindle motor 2 is controlled to the specified playback speed (tangential speed of 1.3 m/s) determined by the crystal oscillator 10.

Another control circuit 12 (for example, integrated circuit type MB8841H manufactured by FUJITSU LIMITED) is provided for controlling various mechanisms of the player, and the circuit 12 constantly receives Q-data in the RF signal representing the data position on the optical disk at which the pickup 3 is currently reading out the record. When the control circuit 12 receives an access signal from the operation switch So, it causes the pickup 3 to make jumps over tracks repeatedly until the pickup 3 reaches the beginning of the program.

A variable-frequency oscillator 13 is provided, and when a switch S is set to position B the oscillator 13 provides a variable master clock signal instead of the crystal oscillator output, thereby enabling control of the playback speed. Another switch S' is operated in unison with the switch S, and when it is set to position B' corresponding to position B of the switch S, it indicates to the control circuit 12 that the variable-frequency oscillator 13 is selected.

Although in the foregoing player the playback speed can be made variable by controlling the variable-frequency oscillator 13 manually or electronically, the access time tends to be extended when the access command is entered in a playback mode other than at the normal speed, as mentioned previously, resulting in the impairment of operability.

The present invention contemplates control of the player, as will be described in detail later, such that when the access command is entered during the playback mode at a speed other than the normal speed, the switch S is temporarily switched to position A to select the crystal oscillator 10 so that the speed is changed to the normal playback speed based on the standard master clock signal and the varied speed playback mode is restored by turning the switch S back to position B upon completion of the access mode.

Figure 2:
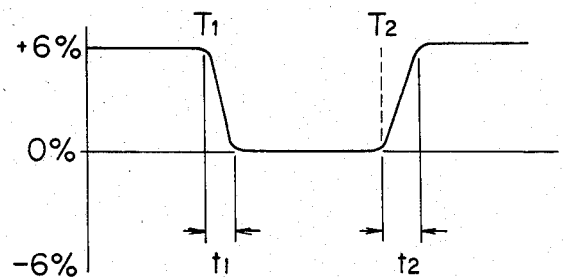
FIG. 2 is a diagram used to explain the mode of the inventive speed control circuit employed in the above player.

More particularly, as shown in FIG. 2, when the access signal is entered at a time point T1 during the playback mode at a 6% faster-speed mode for example, the normal playback speed (0% variation) is brought within a time constant of $\Delta t1$ before the access mode is commenced, and at a time point T2 when the access mode has completed, the original 6% faster-speed is restored within a time constant of $\Delta t2$. The time constants $\Delta t1$ and $\Delta t2$ are determined depending on the response of the spindle motor 2 so that the rotational servo control circuit is not out of the capture range. The speed control can be carried out by using an output (e.g., muting signal) of the control circuit 12.

Figure 3:
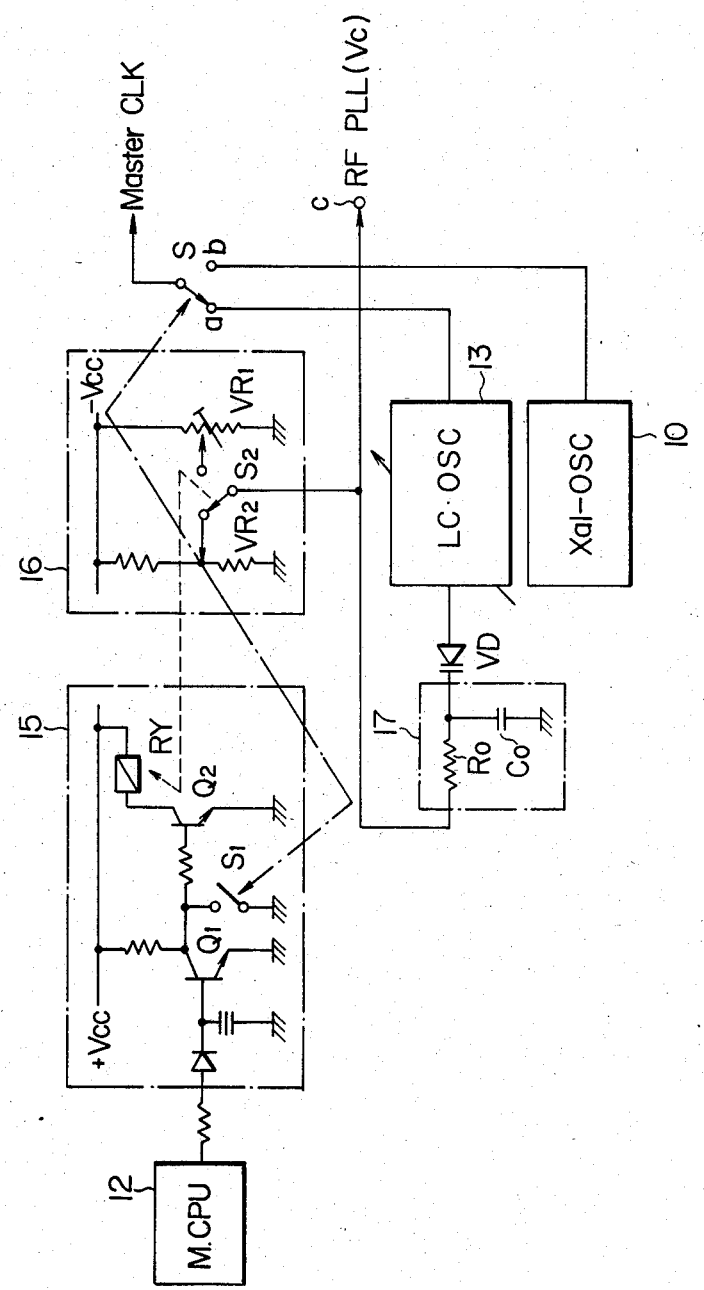
FIGS. 3 and 4 are block diagrams showing embodiments of the invention for producing a variable-frequency master clock for implementing the playback speed control.

FIG. 3 shows an embodiment of the master clock generating circuit forming the inventive disk speed control circuit. Besides the components identical to those shown in FIG. 1 as referred to by the common symbols, the arrangement includes a relay circuit 15 which operates in response to an output, e.g., muting signal, from the control circuit 12, a frequency setup circuit 16 having variable resistors VR1 and VR2 for controlling the output frequency of the variable-frequency oscillator (LC oscillator) 13, and a time constant circuit 17 consisting of a resistor Ro and capacitor Co with its output signal supplied to a varactor diode VD. A switch S2 provided in the frequency setup circuit 16 is operated by a relay RY, while a switch S1 in the relay circuit 15 and previously-mentioned switch S are moved in unison with the variable resistor VR2 so that the S1 opens and the S goes to position a when the slider of the variable resistor VR2 is switched from its central position to the other position, i.e., when the playback speed is controlled to increase or decrease.

Accordingly, during the playback mode at the normal speed, the switch S is set to position b so that the output of the crystal oscillator 10 is fed to the signal processing microprocessor 6 as a master clock, and once the variable resistor VR2 is operated manually to increase (or decrease) the playback speed, the switch S is set to position a so that the output of the variable-frequency oscillator 13 whose frequency is set by the VR2 is fed to the signal processing microprocessor 6 as a master clock. In the latter case, the switch S1 opens, and when the access command is given by the control circuit 12, the relay RY is energized through transistors Q1 and Q2, resulting in the reversal of the switch S2. Then, the variable-frequency oscillator 13 is supplied with the control voltage from the variable resistor VR1 which has been adjusted to cause the oscillation of the standard master clock (8.6436 MHz), and consequently the disk speed is changed to the normal playback speed.

Upon completion of the program access mode in the normal playback speed, the output of the control circuit 12 becomes, "O", causing the relay RY to be deenergized and the switch S2 is reset to supply the control voltage of the variable resistor VR2 to the variable-frequency oscillator 13 thereby to restore the 6% faster-speed playback mode. The speed changes are implemented by application of the control voltage through the time constant circuit 17 as shown in FIG. 2, thereby preventing the spindle motor 2 from free-running out of the capture range of the rotational servo control. The output terminal C provides the control voltage for the VCO in the RF PLL circuit 9.

Figure 4:
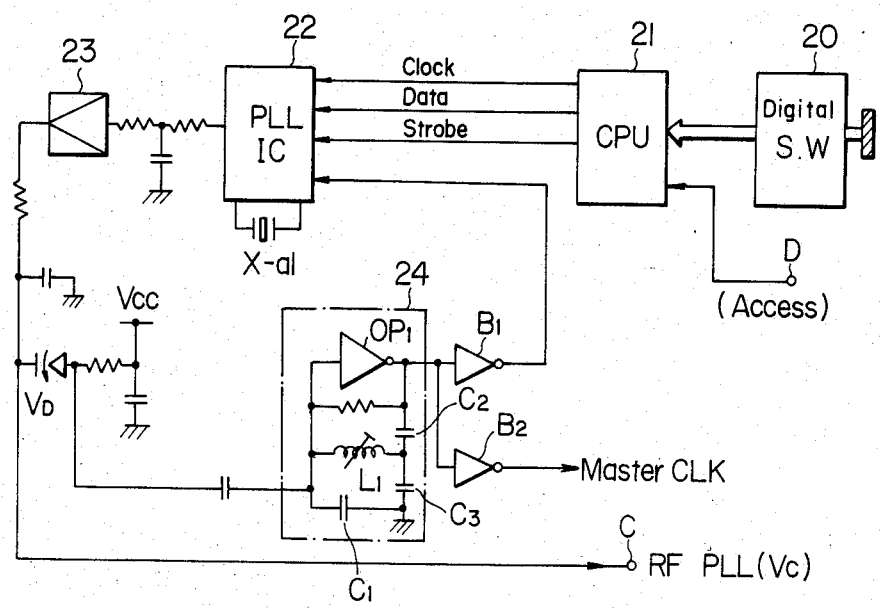

FIG. 4 shows an embodiment of the master clock generator arranged in a PLL circuit. The arrangement includes a set of digital switches 20 for setting up the playback speed, a PLL control circuit 21 (for example, integrated circuit type LM6417 manufactured by SANYO ELECTRIC CO., LTD.) which provides divided outputs in, for example, 1-10 steps for the PLL circuit. As will be described later, when data on the digital switch 20 is transmitted, a PLL circuit 22 (for example, integrated circuit type CX-7925 manufactured by Sony Corp.) including a phase detector, programmable frequency divider and oscillator and operable to generate a master clock of 8.6436 MHz by connection of an external crystal element (X-al), an amplifier 23 for amplifying the error voltage produced by the PLL circuit 22 with the amplified output being fed to a varactor diode VD, and a variable-frequency oscillator 24 consisting of an operational amplifier OP1, inductor L1 and capacitors C1, C2 and C3. The oscillation frequency of the oscillator 24 is varied in response to the control voltage supplied to the varactor diode VD, and the oscillation output is fed through a buffer B1 to the PLL circuit 22 so as to complete a PLL system, while at the same time it is fed through another buffer B2 to the signal processing microprocessor 6 as a master clock. Terminal C is to supply the control voltage to the RF PLL circuit 9, and terminal D is to receive the signal for representing the normal playback speed.

In this embodiment, the variable-frequency oscillator 24 is included within the PLL system with the reference frequency given by the crystal X-al, so that the master clock is controlled to the same frequency (8.6436 MHz) as of the crystal during the normal steady speed playback mode. When the playback speed is to be increased, the digital switch 20 is set to a certain value, e.g., +4%, and the PLL control circuit 21 provides the control signal to the programmable frequency divider which produces the reference signal for the PLL circuit 22, and consequently the output of the oscillator 24 varies to, for example, 9.0433 MHz (by +4%). This frequency transition takes place progressively so as to meet the response of the spindle motor 2, and in this embodiment it is carried out by the PLL control circuit 21 providing the PLL circuit 22 with frequency step-up data at an interval of about 40 microseconds (ms) as will be seen in the operational flowchart.

When the program access command is entered during the playback mode with a +4% master clock provided by the variable-frequency oscillator 24, the PLL control circuit 21 provides the PLL circuit 22 with data for the restoration of the normal disk speed irrespective of the setup on the digital switch 20 in response to the control signal received at the terminal D from the control circuit 12. In consequence, the disk speed is changed to the normal playback speed, and the program access mode takes place.

Upon completion of the access mode, the control signal at the terminal D becomes "O", causing the PLL control circuit 21 to provide data for the 4% increased playback speed set up on the digital switch 20, and the varied speed playback mode before the access mode is restored. The above disk speed transition control is carried out by sensing the access signal to the PLL control circuit 21 and setup data on the digital switch 20.

Figure 6:
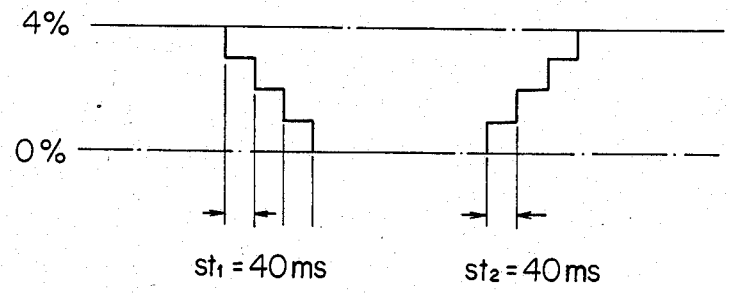
FIG. 6 is a diagram used to explain output data produced by the PLL control circuit.
Figure 5:
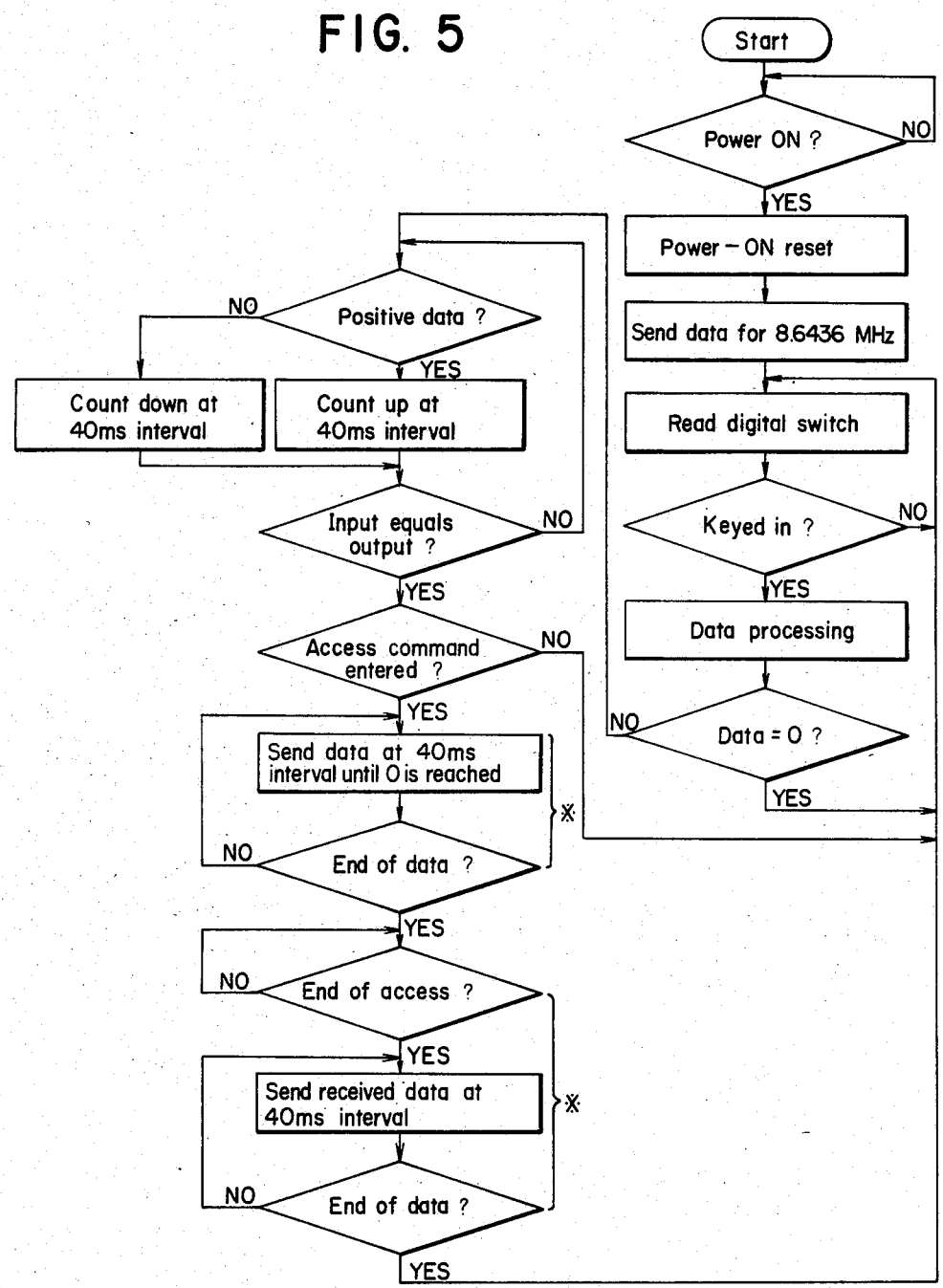
FIG. 5 is a flowchart showing the mode of the phase-locked loop (PLL) control circuit used in the speed control circuit.

FIG. 5 shows, as an example, the operational flowchart implemented by the PLL control circuit 21. In the flowchart, the steps marked by "*" are the control program in which the master clock is temporarily changed to 8.6436 MHz in response to the access signal, and the original master clock frequency is restored upon completion of the access mode. During the execution of these steps, the PLL control circuit 21 is operated on to issue command data to the PLL circuit 22 at an interval of 40 ms so that the output frequency is increased or decreased progressively in accordance with a stepped frequency command data as shown in FIG. 6.

In this embodiment, the output of the variable-frequency oscillator 24 is steadily phase-locked by the digital PLL system, and therefore the produced clock is stable. In addition, elimination of switch and relay contacts in the control circuit enables a smooth speed control operation.

As described above, the inventive disk speed control circuit operates such that when the program access signal is entered during the playback mode at an increased or decreased playback speed, the playback speed is temporarily changed to the normal speed and, upon completion of the access mode, the original playback speed is restored, whereby the access time is independent of the playback speed and the operability of the disk record player is enhanced.

What is claimed is:

1. An optical disk record player comprising a means for dividing an optical disk on which digital data signals are recorded; a means for detecting said digital signals on said disk; a signal processing circuit for processing the detected digital signals; a drive control circuit for controlling said disk drive means in accordance with the output from said signal processing means; a control circuit for producing a program access mode signal and which receives data position information representing positions of said digital data on said disk in response to an output of said signal detecting means; a clock generating means for producing a clock signal used for signal processing by said signal processing circuit; setup means for selecting a disk speed corresponding to a non-normal disk speed and a disk speed control means controlling said clock generating means to vary the frequency of said clock signal by an amount set on said setup means, said clock generating means automatically producing a reference clock signal corresponding to a normal disk speed during the program access mode.

2. An optical disk record player according to claim 1, wherein said clock generating means comprises a reference signal generator and a variable-frequency oscillator, and wherein a switching means is provided for selecting one of said reference signal generator and said variable-frequency oscillator and aranged to be operated in unison with said setup means for selecting a non-normal disk speed.

3. An optical disk record player according to claim 2 further comprising a relay which operates in response to the program access mode signal ouput of said control circuit so that a first selector switch that is arranged to be moved in unison with said switching means is operated by said relay.

4. An optical disk record player according to claim 3, wherein said setup means comprises a first variable resistor which is preset so that said variable-frequency oscillator produces a predetermined reference frequency, a second variable resistor which is arranged to be moved in unison with said first selector switch for producing an output to vary the oscillation frequency of said variable-frequency oscillator, and a second selector switch which is arranged for actuation by the operation of said relay so as to interchange the selection of said first variable resistor and second variable resistor for connection to said variable frequency oscillator.

5. An optical disk record player according to claim 4, wherein said setup means supplies the output through a time constant circuit to said variable-frequency oscillator.

6. An optical disk record player according to claim 1, wherein said setup means comprises a digital switch.

7. An optical disk record player according to claim 6, wherein said clock generating means comprises a reference signal generator and a variable-frequency oscillator, and wherein a switching means is provided for selecting one of said reference signal generator and variable-frequency oscillator depending on the output of said control circuit.

8. An optical disk record player according to claim 7, wherein said reference signal generator comprises a phase locked loop (PLL) circuit including a phase comparator, a programmable frequency divider and an oscillation circuit, and a crystal oscillation element connected to said PLL circuit.

9. An optical disk record player according to claim 8, wherein said switching means further functions to supply the output of said digital switch in a predetermined number of steps to said phase locked loop circuit.

10. An optical disk record player according to claim 9, wherein said variable-frequency oscillator comprises an operational amplifier, an inductor and a plurality of capacitors.

11. An optical disk record player according to claim 10 further comprising an amplifier for amplifying the output said phase locked loop circuit and a varactor diode which varies the frequency of said variable-frequency oscillator in response to the output of said amplifier.

* * * * *